(12) United States Patent
Łańko (10) Patent No.: US 10,215,313 B2
(45) Date of Patent: Feb. 26, 2019

(54) FLEXIBLE CONDUIT ASSEMBLY FOR THE FLOW OF FLUIDS AND A PROCEDURE FOR SHAPING THE FLEXIBLE CONDUIT FOR THE FLOW OF FLUIDS

(71) Applicant: KONGSBERG AUTOMOTIVE SP. Z O.O., Pruszków (PL)

(72) Inventor: Mateusz Łańko, Rożwienica (PL)

(73) Assignee: KONGSBERG AUTOMOTIVE SP. Z.O.O., Pruszków (PL)

( * ) Notice: Subject to any disclaimer, the term of this patent is extended or adjusted under 35 U.S.C. 154(b) by 0 days.

(21) Appl. No.: 15/644,408

(22) Filed: Jul. 7, 2017

(65) Prior Publication Data
US 2018/0010715 A1 Jan. 11, 2018

(30) Foreign Application Priority Data
Jul. 7, 2016 (PL) .......................................... 417875

(51) Int. Cl.
| F16L 3/00 | (2006.01) |
| F16L 11/10 | (2006.01) |
| F16L 57/02 | (2006.01) |
| F16L 55/035 | (2006.01) |

(52) U.S. Cl.
CPC .............. *F16L 11/10* (2013.01); *F16L 55/035* (2013.01); *F16L 57/02* (2013.01)

(58) Field of Classification Search
CPC .... F16L 3/1226; A61M 5/1418; A61M 25/02; A61M 2025/0246
USPC ....................................................... 138/106
See application file for complete search history.

(56) References Cited

U.S. PATENT DOCUMENTS

| 3,326,601 A | 6/1967 | Vanderbilt et al. | |
| 3,942,528 A * | 3/1976 | Loeser .................. | A61M 25/02 604/174 |
| 4,029,103 A * | 6/1977 | McConnell ........... | A61M 25/02 128/DIG. 26 |
| 5,916,199 A * | 6/1999 | Miles .................... | A61M 25/02 604/174 |
| 6,001,081 A * | 12/1999 | Collen .................. | A61M 25/00 604/174 |
| 7,571,744 B2 * | 8/2009 | Zia ....................... | A61M 5/1418 138/103 |
| 8,584,323 B2 * | 11/2013 | Pang .................... | A61M 5/1418 24/132 R |
| 8,640,738 B2 * | 2/2014 | Zia ....................... | A61M 5/1418 138/103 |

FOREIGN PATENT DOCUMENTS

| DE | 10242760 A1 | 3/2004 |
| JP | H10122448 A | 5/1998 |

(Continued)

OTHER PUBLICATIONS

Polish Search Report for application No. P.417875 dated Mar. 29, 2017, 3 pages.

*Primary Examiner* — Patrick F Brinson
(74) *Attorney, Agent, or Firm* — Cantor Colburn LLP (57) ABSTRACT

A fluid flow conduit assembly includes a flexible conduit having a closed cross section, and a connector. The connector has first and second layers with the flexible conduit extending between the first and second layers, and wherein the first and second layers are permanently attached to each other outside of the flexible conduit.

12 Claims, 6 Drawing Sheets

(56) References Cited

FOREIGN PATENT DOCUMENTS

| | | | |
|---|---|---|---|
| PL | 68882 | Y1 | 2/2017 |
| WO | 8700147 | A1 | 1/1987 |
| WO | 0101029 | A1 | 1/2001 |

* cited by examiner

FLEXIBLE CONDUIT ASSEMBLY FOR THE FLOW OF FLUIDS AND A PROCEDURE FOR SHAPING THE FLEXIBLE CONDUIT FOR THE FLOW OF FLUIDS

CROSS REFERENCE TO RELATED APPLICATION

This application claims the priority of Polish Patent Application No. P417875 filed on Jul. 7, 2016, which is incorporated herein by reference in its entirety.

INTRODUCTION

The present disclosure relates to fluid flow conduits, and more particularly to a flexible fluid flow conduit assembly reinforced by a connector.

Flexible conduits used in various structures in which a liquid or gas must be transported from one place to another are exposed to different environmental influences. For example, pressure from within or without or relatively strong vibrations can act on them. Simply installing thin and fragile conduits made of a synthetic material such as polyvinyl chloride, for example, exposes them to uncontrolled bending or even fracture. The space for flexible conduits in the places where they are mounted is also usually very limited.

Flexible conduits can initially be formed into any desired shape conditioned by the purpose of the conduit. If, for example, a flexible conduit must be bent in order to change the direction of its course, there may be a chance that the flexible conduit will be subject to damage, from the standpoint of operation, plastic deformation, bending, fracture, and the like. This problem is such that it is necessary to take steps to prevent it. Solutions to this problem known in the state of technology pertain primarily to stiffening the segment of the flexible conduit where a change in the direction of its course will occur.

Various technical measures have been used for this purpose. One such technical measure is placing an additional connector made of a rigid synthetic material (e.g., plastic) in the flexible conduit at the point of a change in its direction. This connector can be bent to the required angle, 90°, for example. Should the need arise for the angle for deflection of the flexible conduit to be 180° and at that point, a rigid connector with a double right-angle bend or two connectors bent at right angles may be used that are joined by a short length of flexible conduit.

The solutions known from the state of technology only partially solve the problems relating to a change in the course of the flexible conduit. Joining a flexible conduit to a connector is accomplished by sliding the flexible conduit onto the tip of the connector. This may cause leakage, or failure, at the union of the two elements, which may have a negative effect on the operation of this type of junction and the entire device. In addition, at the point where the angled connector is attached to the flexible conduit there may be a threshold that causes unnecessary noise to be generated during the flow of air through the node.

Flexible conduits joined by connectors known from the state of the art at the point of change in course direction can require additional elements necessary for suspending or mounting them at the point of assembly.

A solution pertaining to the seat in a motor vehicle in which the seat cushion and backrest are equipped with a number elements intended for pressure massage that can be activated by the driver to obtain various massage effects is known from German patent description DE10242760. These elements are mounted on the surface of the seat and backrest of the car seat and connected by flexible conduits that run with changes in direction without any protection against breakage, bending, or deformation.

A solution in which air chambers mounted on the surface of the seat and backrest of the car seat are connected to an air supply system using flexible conduits made of plastic not protected against breakage is known from U.S. Pat. No. 3,326,601, filed Jul. 28, 1965.

SUMMARY

The object of the present disclosure is to develop a solution that is free of the defects known from the state of the art, that is, to protect flexible conduits used in various air and hydraulic installations against deformation, bending, breakage, and the like, as well as against the generation of noise in the installation, and also to reduce production costs.

A fluid flow conduit assembly according to one, non-limiting, embodiment of the present disclosure includes a first flexible conduit having a closed cross section, and a connector. The connector has first and second layers with the first flexible conduit extending between the first and second layers, and wherein the first and second layers are permanently attached to each other outside of the first flexible conduit.

Additionally to the foregoing embodiment, a first portion of the first flexible conduit is longitudinally curvilinear and disposed between the first and second layers.

In the alternative or additionally thereto, in the foregoing embodiment, a first portion of the first flexible conduit is longitudinally rectilinear and disposed between the first and second layers.

In the alternative or additionally thereto, in the foregoing embodiment, the first portion lies in a single plane.

In the alternative or additionally thereto, in the foregoing embodiment, the first portion lies in a three-dimensional space.

In the alternative or additionally thereto, in the foregoing embodiment, the fluid flow assembly includes a second flexible conduit including a second portion disposed between the first and second layers.

In the alternative or additionally thereto, in the foregoing embodiment, the first and second portions extend substantially straight.

In the alternative or additionally thereto, in the foregoing embodiment, at least one of the first and second portions are longitudinally curvilinear.

In the alternative or additionally thereto, in the foregoing embodiment, the connector is made of a plastic film.

In the alternative or additionally thereto, in the foregoing embodiment, the first layer is welded to the second layer in a plurality of weld segments that are linearly perpendicular to a longitudinal axis of the flexible conduit.

A method of shaping a flexible fluid flow conduit according to another, non-limiting, embodiment, utilizes a connecting device that has a primary form with a primary pocket insert and a second pocket insert. The method includes the primary form of the connecting device being placed in the primary pocket insert, which reproduces the course of the flexible conduit, the primary layer of the connector. The flexible conduit is placed in the first layer of the connector the primary pocket insert of the primary form of the connecting device. The second layer of the connector is placed in the first layer of the connector and the flexible conduit, which are placed in the primary pocket insert in the shape of the connecting device. The connecting device is closed off by a second shape so that the second pocket insert with the second shape of the connecting device fits in the second layer placed in the flexible conduit. The first layer of the connector is permanently attached to the second layer of the connector.

Additionally to the foregoing embodiment, the first layer is permanently attached to the second layer by welding.

In the alternative or additionally thereto, in the foregoing embodiment, the first layer is permanently attached to the second layer by welding with high-frequency currents.

In the alternative or additionally thereto, in the foregoing embodiment, the first layer is permanently attached to the second layer by welding in basically a line that is perpendicular to a lengthwise axis of the flexible conduit.

In the alternative or additionally thereto, in the foregoing embodiment, at least two flexible conduits are placed between the first layer and the second layer in the first pocket insert with the second shape.

In the alternative or additionally thereto, in the foregoing embodiment, the connector is made of a plastic film.

n the alternative or additionally thereto, in the foregoing embodiment, the connector is formed about the flexible conduit by the connecting device.

In the alternative or additionally thereto, in the foregoing embodiment, the method includes removing the connecting device from the connector after forming.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

The subject of the present disclosure is shown in an example of implementation in the drawing in which.

DETAILED DESCRIPTION

Figure 1:
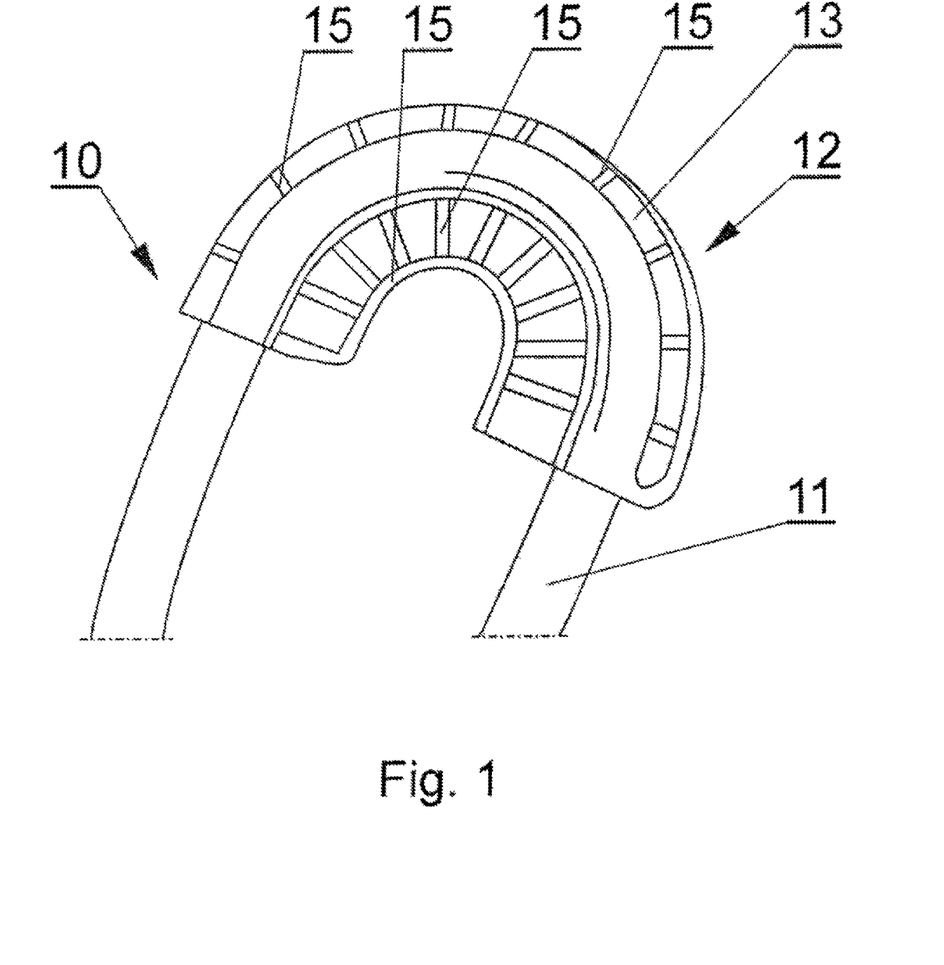
FIG. 1 represents the flexible conduit assembly in a perspective view.

As shown in FIG. 1, the flexible conduit assembly 10 may include a flexible conduit 11, and a main connector 12 having first and second layers (13, 14). The flexible conduit 11 may be placed between the first layer 13 and the second layer 14. The first layer 13 and the second layer 14 of the main connector 12 are permanently attached to each other. The flexible conduit 11 is placed between these layers, and the attachment of the first layer 13 to the second layer 14 of the flexible conductor 12 occurs at their outer flaps, generally extending from their distal edges to the flexible conduit 11.

In the example of implementation shown in FIG. 1, the first layer 13 and second layer 14 of the main connector 12 are connected to each other by induction welding in special shaping molds, or forms (i.e., the connecting device 20).

The two layers 13, 14 of the main connector 12 are connected so that getting the desired shape for the flexible conduit 11 that results from its course at the point of destination. This course may be arbitrarily shaped in accordance with the structural foundation and destination of the flexible conduit assembly 10.

Figures 5A, 5B:
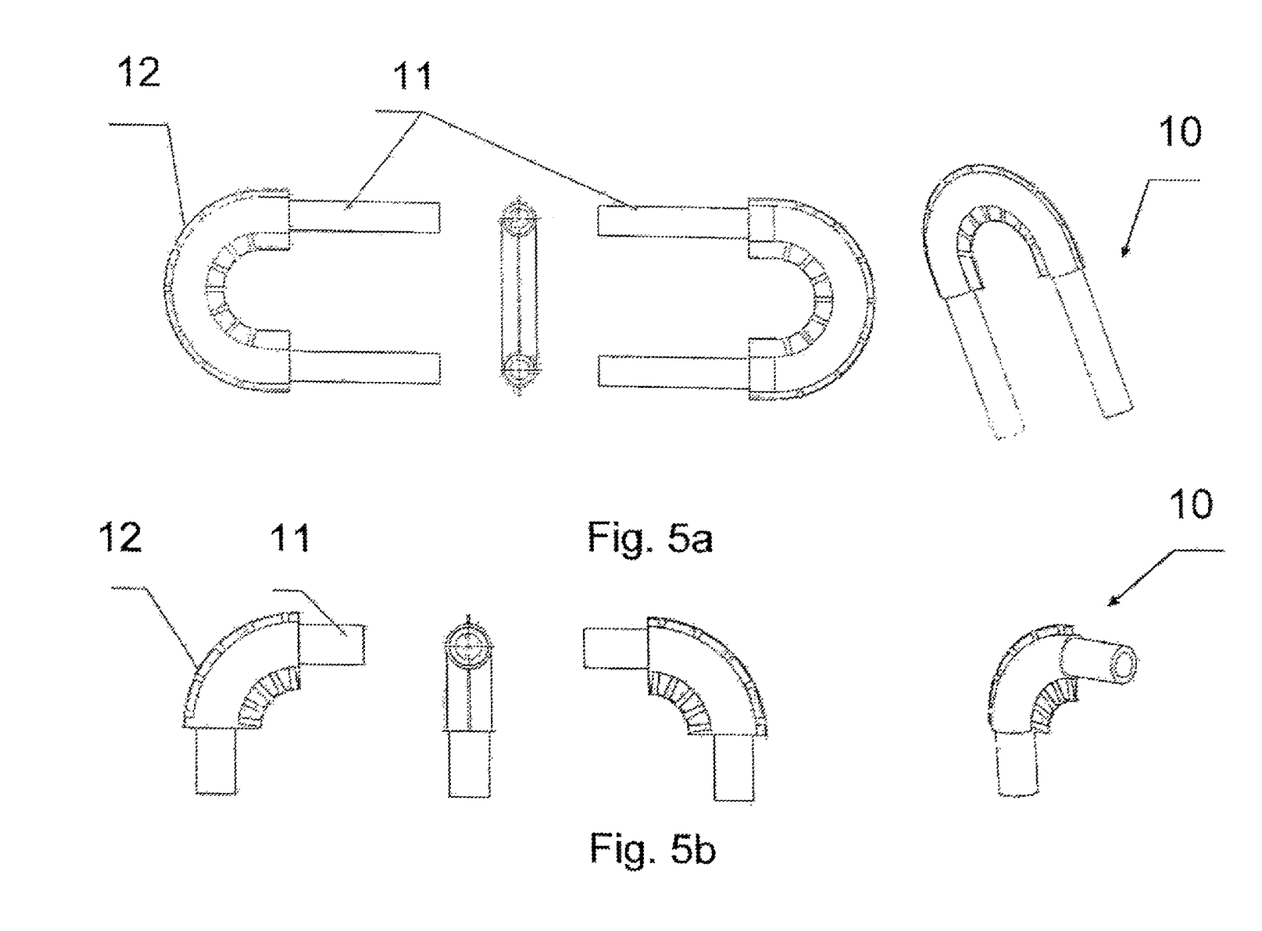
FIG. 5a shows the flexible conduit assembly bent at an angle of 180° in three projections and in the perspective view.
FIG. 5b shows the flexible conduit assembly bent at an angle of 90° in three projections and in the perspective view.

FIG. 5a and FIG. 5b show sample courses for the positions of the flexible conduit 11 in the connector 12 of the assembly 10.

As shown, in the example of implementation, in FIG. 5a, the flexible conduit 11 in the flexible conduit assembly 10 changes the direction of its course by 180° and is stiffened in the flexible connector 12 between the first layer 13 and the second layer 14 to such an extent that does not threaten to break it, limit flow, or cause other damage that may lead to problems with its proper functioning.

As shown in the example of implementation in FIG. 5b, the flexible conduit 11 in the connector 12 of the assembly 10 changes the direction of its course by 90°, and is stiffened in, and by, the flexible connector 12 between the first layer 13 and second layer 14.

In both the examples of implementation shown in FIG. 5a and FIG. 5b, the flexible conduit 11 in the connector 12 of the assembly 10 lies in one plane, but it is evident that the course of the flexible conduit 11 formed by the flexible connector 12 can be arbitrary and may run at any angle from 0° (for the flexible conduit 11, or flexible conduits 11, that run straight in the assembly 10) to 180° or more for conduits that turn back or are looped. These flexible conduits 11 can also run in the connector 12 of the flexible conduit assembly 10 in a three-dimensional space and not just in one plane.

Figure 2:
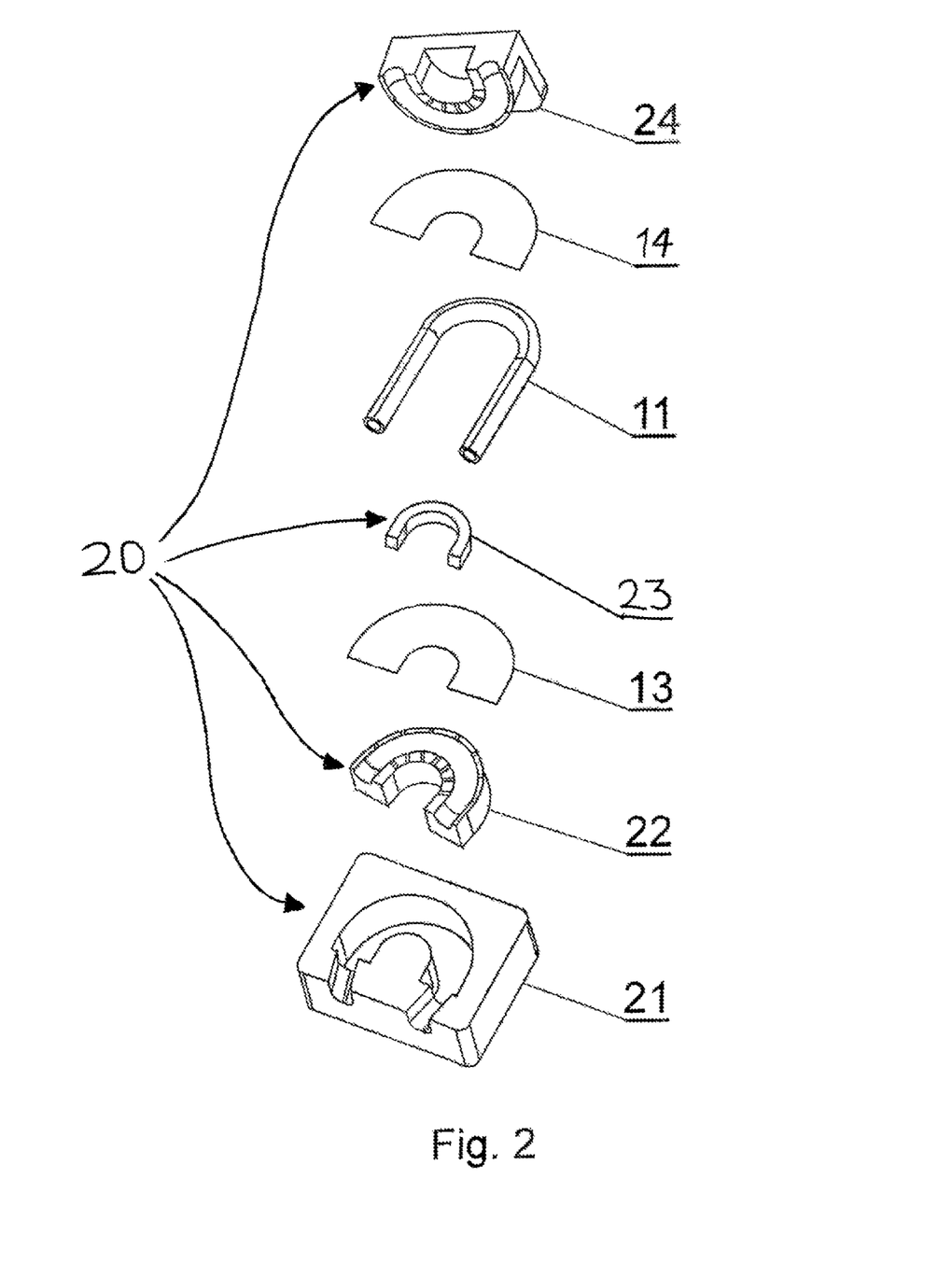
FIG. 2 shows the elements of the flexible conduit assembly in an exploded view in the course of shaping the flexible conduit system.

Referring to FIG. 2, one embodiment of a method of shaping and reinforcing the flexible conduit 11 by utilizing the connector 12 and the connecting device 20 is generally illustrated.

Figure 3:
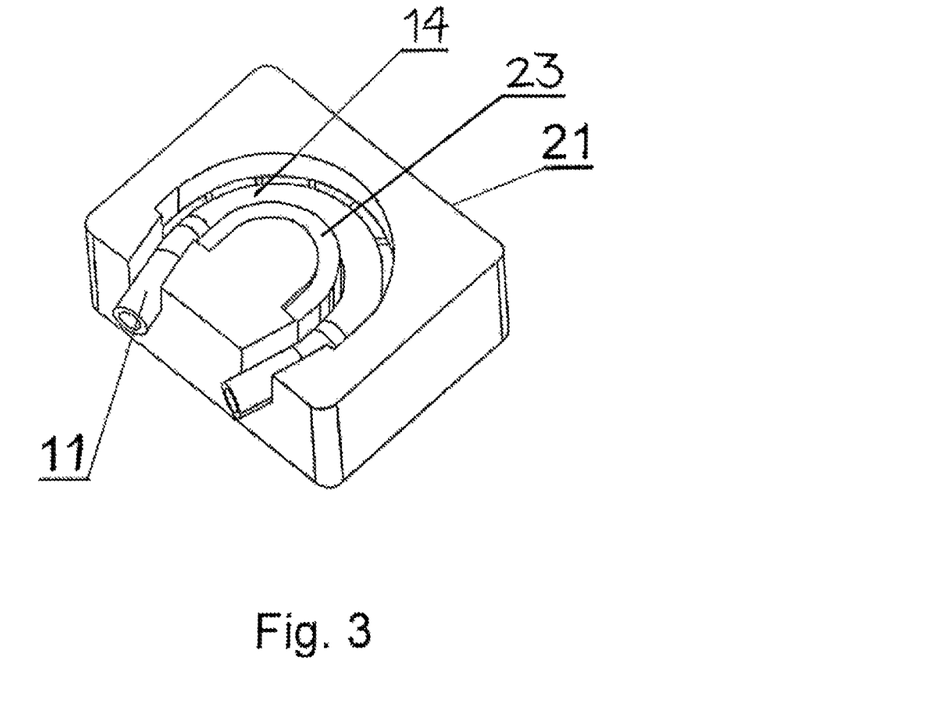
FIG. 3 shows the first form with the first layer of the main connector and the flexible conduit placed in it.
Figure 4:
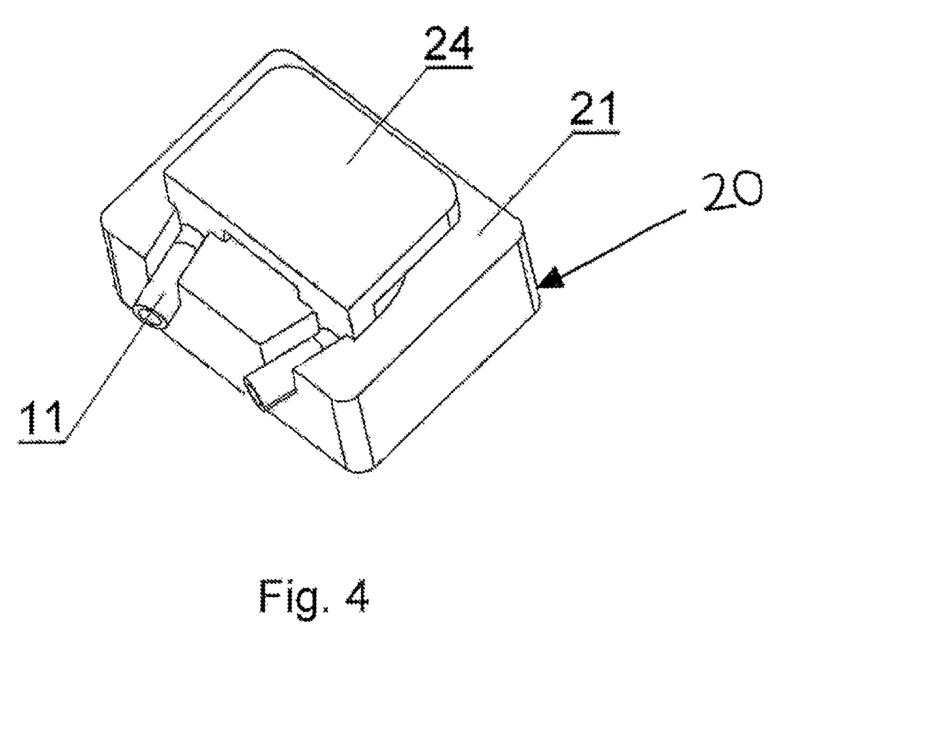
FIG. 4 shows the first form with the second form placed on it and elements of the flexible conduit assembly between them.

The method of forming the flexible conduit assembly 10 for the flow of liquids utilizes the connecting device 20 that has a first form with a first pocket and a second form with a second pocket. The connecting device 20, which reproduces the course of the flexible conduit 11, the first layer 13 of the main connector 12, is placed in the first pocket 22 of the first form 21. The flexible conduit 11, which is shown in FIG. 3, is placed in the first layer 13 of the main connector 12 in the first pocket 22 of the first form 21. The second layer 14 of the main connector 12 is placed in the first layer 13 of the main connector 12 in the first pocket 22 of the first form of the connecting device 20. The second layer 14 of the main connector 12 is placed in the first layer 13 of the main connector 12 and flexible conduit, which is placed in the first pocket in the first form 21 of the connecting device. The connecting device 20 ends with the second form 23 so that the second pocket 24 in the second form 23 of the connecting device 20 fits in the second layer 14 placed on the flexible conduit 11. The first layer 13 of the main connector 12 is connected to the second layer 14 of the main connector 12 by high-frequency welding of the two layers such that the first layer 13 of the main connector 12 is permanently attached to the second layer 14 of the main connector 12 by a linear weld, substantially perpendicular to the lengthwise axis of the flexible connector 11.

Here, it is clear that the two layers 13, 14 of the main connector 12 may be joined with quick-drying adhesive. It is apparent to create all types of flexible conduit assemblies 10 described above, and in the patent claims by using the method based on this invention.

Figure 6:
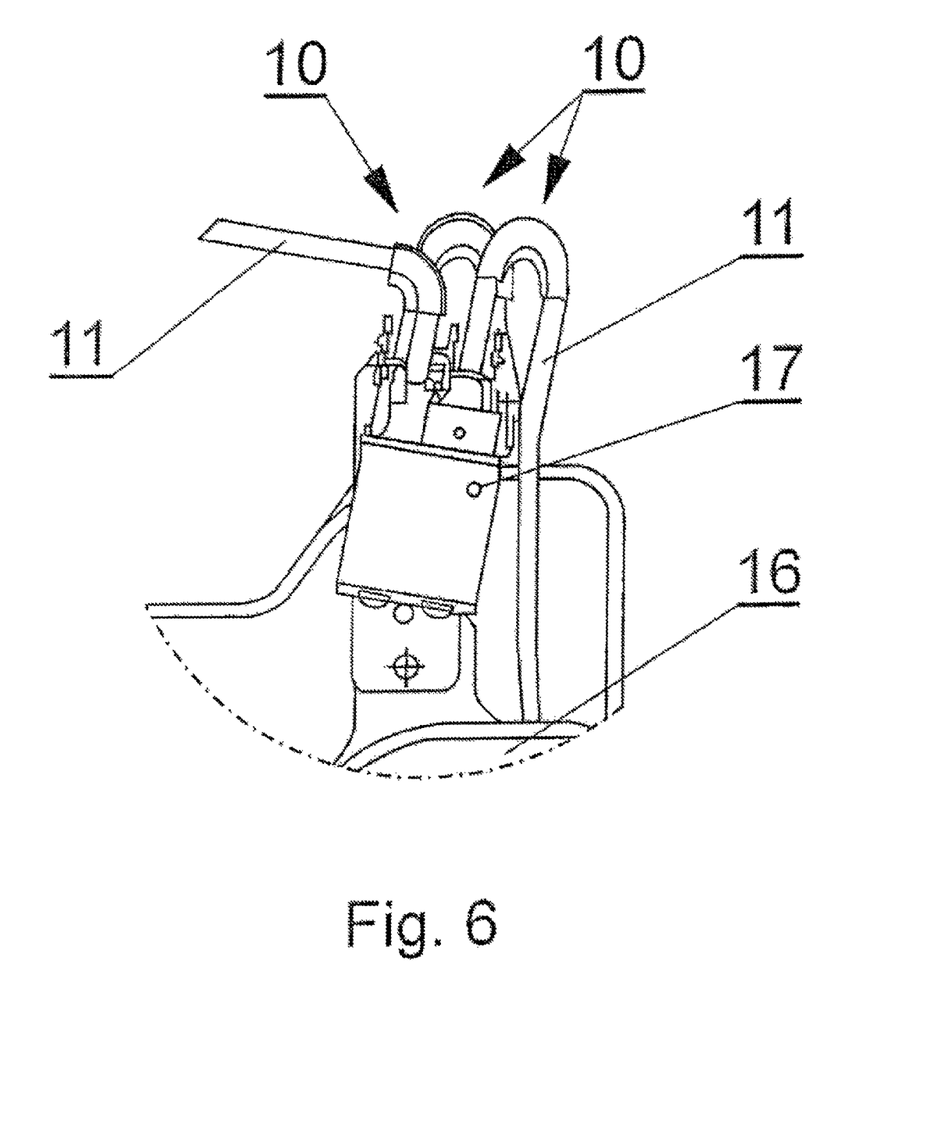
FIG. 6 shows the first example of using the flexible conduit assembly.
Figure 7:
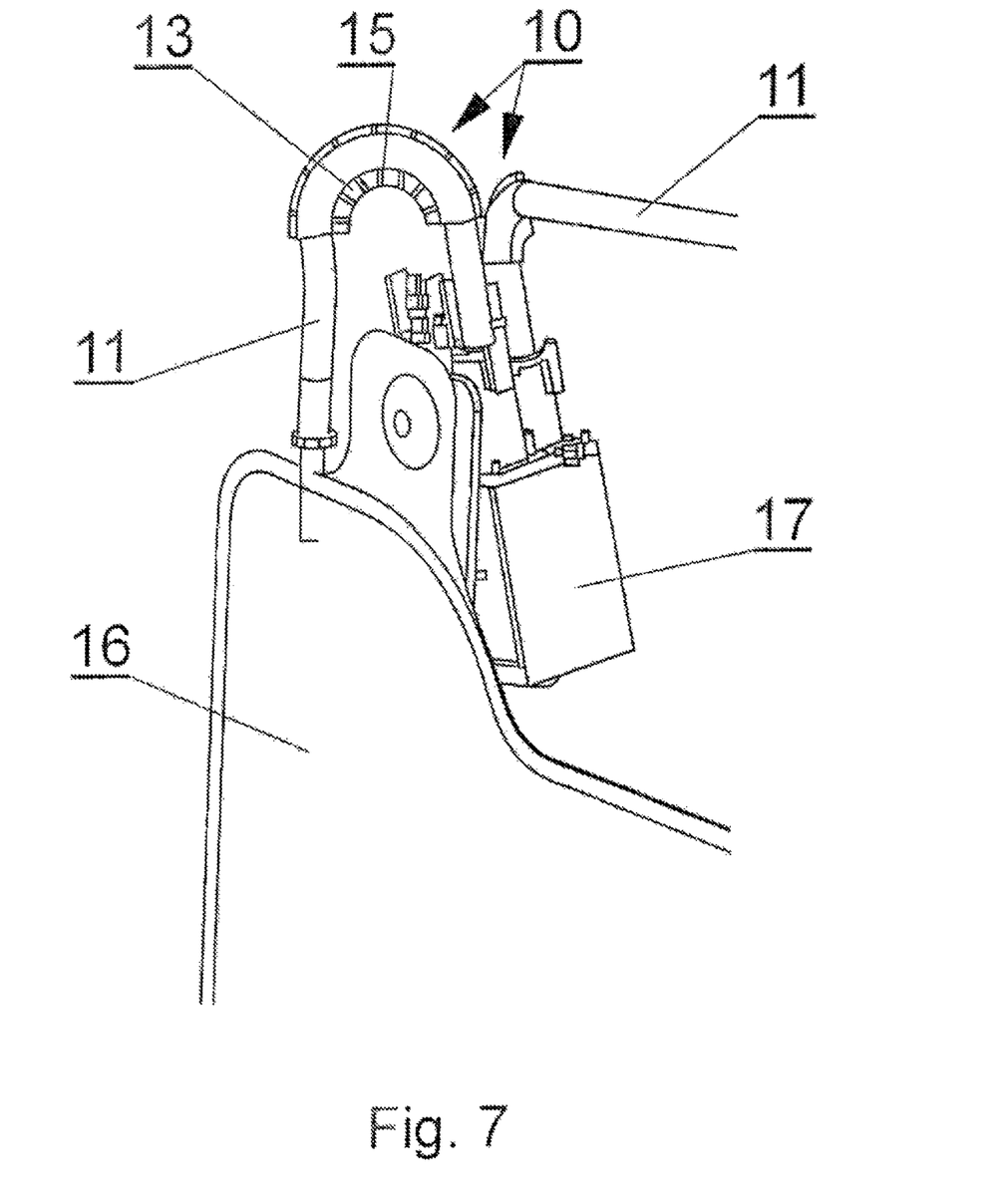
FIG. 7 shows an example of using the flexible conduit assembly.

FIG. 6 and FIG. 7 show sample applications of the flexible conduit assembly 10. These sample applications include automobile seats with a massage function using chambers 16 that are filled as needed with air supplied from a pneumatic installation. The air is supplied from a pneumatic installation at a distance from the car seats by means of flexible conduits 11. At the point where a change in the direction of the flexible conduits 11 is necessary, they are placed in a flexible conduit system 10 so that the desired direction of the flexible conduit 11 run is ensured by this assembly 10. As FIGS. 6 and 7 show, air supplied by the flexible conduits 11 is directed to the controller 17, which regulates the parameters of the fluid in the system such as pressure, temperature, pulsation, and the like after the change in the direction of their course in the flexible conduit 11 assembly 10. From the controller 17, air is directed by the flexible conduits 11 to the chamber 16 that may be in the shape of cushions. Along its path, the direction of the course of the flexible conduits 11 is altered in the flexible conduit assembly 10. FIG. 6 and FIG. 7 shows this node in the car seat with a pneumatic massage unit that is fragmented from different sides.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims

The invention claimed is:

1. A fluid flow conduit assembly comprising:
   a first flexible conduit (11) including a closed cross section; and
   a connector (12) including first and second layers (13, 14) with the first flexible conduit (11) extending between the first and second layers (13, 14), the first and second layers (13, 14) are permanently attached to each other outside of the first flexible conduit (11), wherein the connector (12) is made of a plastic film.

2. The fluid flow conduit assembly in accordance with claim 1, wherein a first portion of the first flexible conduit (11) is longitudinally curvilinear and disposed between the first and second layers (13, 14).

3. The fluid flow conduit assembly in accordance with claim 1, wherein a first portion of the first flexible conduit (11) is longitudinally rectilinear and disposed between the first and second layers (13, 14).

4. The fluid flow conduit assembly in accordance with claim 2, wherein the first portion lies in a single plane.

5. A fluid flow conduit assembly comprising:
   a first flexible conduit (11) including a closed cross section; and
   a connector (12) including first and second layers (13, 14) with the first flexible conduit (11) extending between the first and second layers (13, 14), and the first and second layers (13, 14) are permanently attached to each other outside of the first flexible conduit (11), wherein the first layer (13) is welded to the second layer (14) in a plurality of weld segments (15) that are linearly perpendicular to a longitudinal axis of the flexible conduit (11).

6. A method of shaping a flexible fluid flow conduit (11) in which a connecting device (20) that has a primary form (21) with a primary pocket insert (22) and a second pocket insert (24) is used, the method comprising:
   the primary form (21) of the connecting device (20) is placed in the primary pocket insert (22), which reproduces the course of the flexible conduit (11), the primary layer 13 of the connector (12);
   the flexible conduit (11) is placed in the first layer (13) of the connector (12) in the primary pocket insert (22) of the primary form (21) of the connecting device;
   the second layer (14) of the connector (12) is placed in the first layer (13) of the connector (12) and the flexible conduit (11) which are placed in the primary pocket insert (22) in the shape of the connecting device (20);
   the connecting device (20) is closed off by a second shape (23) so that the second pocket insert (24) with the second shape (23) of the connecting device (20) fits in the second layer (14) placed in the flexible conduit (11);
   the first layer (13) of the connector (12) is permanently attached to the second layer (14) of the connector (12).

7. The method in accordance with claim 6, wherein the first layer (13) is permanently attached to the second layer (14) by welding.

8. The method in accordance with claim 7, wherein the first layer (13) is permanently attached to the second layer (14) by welding with high-frequency currents.

9. The method in accordance with claim 6, wherein the first layer (13) is permanently attached to the second layer (14) by welding in basically a line that is perpendicular to a lengthwise axis of the flexible conduit (11).

10. The method in accordance with claim 6, wherein the connector (12) is made of a plastic film.

11. The method in accordance with claim 6, wherein the connector (12) is formed about the flexible conduit (11) by the connecting device (20).

12. The method in accordance with claim 11, further comprising:
   removing the connecting device (20) from the connector (12) after forming.

* * * * *